(12) United States Patent
Meijer et al.

(10) Patent No.: US 12,546,633 B2
(45) Date of Patent: Feb. 10, 2026

(54) FIBRE-OPTIC SENSOR FOR MEASURING A PHYSICAL QUANTITY

(71) Applicant: Somni Corporation B.V., Delft (NL)

(72) Inventors: Eric Meijer, Leiderdorp (NL);
Bastiaan Meulblok, Roelofarendsveen (NL); Germán Enrique Knoppers, Pijnacker (NL)

(73) Assignee: SOMNI CORPORATION B.V., Delft (NL)

(*) Notice: Subject to any disclaimer, the term of this patent is extended or adjusted under 35 U.S.C. 154(b) by 337 days.

(21) Appl. No.: 18/282,673

(22) PCT Filed: Mar. 18, 2022

(86) PCT No.: PCT/NL2022/050148
§ 371 (c)(1),
(2) Date: Sep. 18, 2023

(87) PCT Pub. No.: WO2022/197185
PCT Pub. Date: Sep. 22, 2022

(65) Prior Publication Data
US 2024/0167853 A1   May 23, 2024

(30) Foreign Application Priority Data

Mar. 19, 2021 (NL) .................................... 2027778

(51) Int. Cl.
*G01D 5/353* (2006.01)
*G01K 11/3206* (2021.01)
(Continued)

(52) U.S. Cl.
CPC ..... *G01D 5/35316* (2013.01); *G01K 11/3206* (2013.01); *G01L 1/246* (2013.01); *G01P 15/093* (2013.01)

(58) Field of Classification Search
CPC .. G01D 5/35316; G01D 5/35377; G01C 9/06; G01C 2009/066; G01K 11/3206;
(Continued)

(56) References Cited

U.S. PATENT DOCUMENTS 6,229,827 B1 * 5/2001 Fernald ................ G02B 6/0218
372/64
6,519,388 B1 * 2/2003 Fernald ................ G02B 6/022
65/382

(Continued)

FOREIGN PATENT DOCUMENTS

DE          19724528 A1    12/1998
DE        102013101432 A1    8/2014
(Continued)

OTHER PUBLICATIONS

International Search Report and Written Opinion for the International Application No. PCT/NL2022/050148, May 25, 2022, 12 pages.

*Primary Examiner* — Octavia Hollington
(74) *Attorney, Agent, or Firm* — KDW Firm PLLC

(57) ABSTRACT

A fibre-optic sensor for measuring a physical quantity, such as a pressure, force, acceleration or tilt, includes an optical fibre having a measurement section for measuring a strain in the fibre, and first and second structural members. The optical fibre is connected to a first fibre connection section of the first structural member and to a second fibre connection section of the second structural member. The first and second connection sections are arranged on opposite sides of the measurement section, such that at least the measurement section is suspended between the first and second fibre connection sections. At least one of the structural members is movable relative to the other in dependence of the physical quantity that is measured. The structural members are made from materials having different coefficients of
(Continued)

Figure 1:
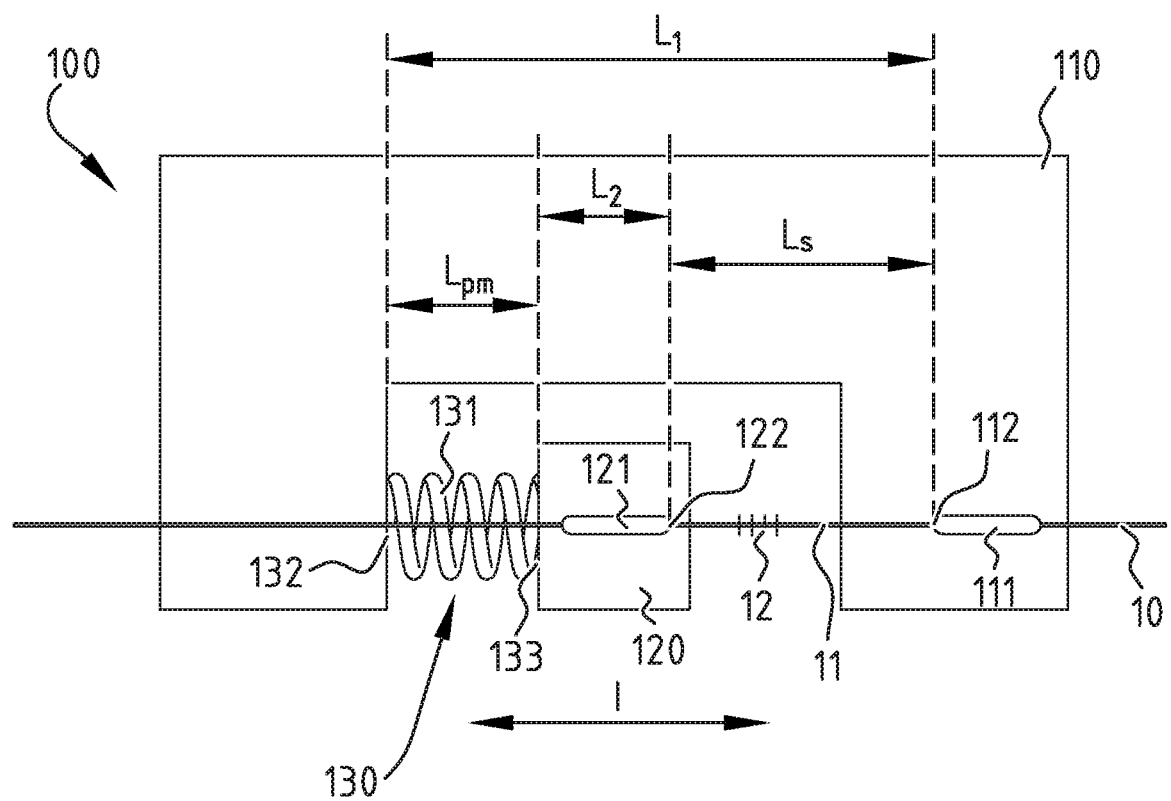

thermal expansion such that a temperature induced strain in said optical fibre due to a temperature change is reduced.

20 Claims, 5 Drawing Sheets

(51) Int. Cl.
*G01L 1/24* (2006.01)
*G01P 15/093* (2006.01)

(58) Field of Classification Search
CPC ....... G01L 1/246; G01L 7/065; G01L 11/025; G01P 15/093
See application file for complete search history.

(56) References Cited

U.S. PATENT DOCUMENTS

| | | | |
|---|---|---|---|
| 6,668,656 B2* | 12/2003 | Fernald | G01L 11/025 73/705 |
| 6,865,194 B1* | 3/2005 | Wright | G01K 11/32 356/73.1 |
| 6,907,164 B2 | 6/2005 | Lachance | |
| 6,955,085 B2 | 10/2005 | Jones | |
| 7,406,877 B2* | 8/2008 | Maurin | G01D 5/35303 73/800 |
| 8,244,088 B2* | 8/2012 | Putnam | H01S 3/06754 385/124 |
| 8,805,128 B2* | 8/2014 | Wild | G01K 11/3206 385/12 |
| 10,976,338 B2* | 4/2021 | Hung | G01P 15/093 |
| 2016/0116670 A1 | 4/2016 | Toyserkani | |

FOREIGN PATENT DOCUMENTS

| | | | |
|---|---|---|---|
| EP | 1679497 A1 | 7/2006 | |
| EP | 2295946 A1 | 3/2011 | |

\* cited by examiner

FIBRE-OPTIC SENSOR FOR MEASURING A PHYSICAL QUANTITY

This application is a national stage filing under 35 U.S.C. 371 of pending International Application No. PCT/NL2022/050148, filed Mar. 18, 2022, which claims priority to Netherlands patent application 2027778, filed Mar. 19, 2021 the entirety of which applications are incorporated by reference herein.

The invention relates to a fibre-optic sensor for measuring a physical quantity, and to a method of providing such a fibre-optic sensor.

Traditional electrical sensors generate electrical signals that are transported to an interrogator for converting the electrical signals to the quantity that is to be determined. These electrical sensors are however sensitive to electromagnetic interference, caused for instance by high voltage electricity, thereby leading to substantial amounts of noise in the measurements. Fibre optic sensors are, however, highly suitable for use in these types of applications, as optical signals are generated which guided through optical fibres that do not conduct electricity, nor do they suffer from electromagnetic interference. Fibre optic sensors are used in a wide variety of different sensors measuring strains, pressures, forces, acceleration or tilt angles.

Fibre-optic sensor typically comprises a structural arrangement comprising two structural members that are movable with respect to each other in dependence of the physical quantity that is measured where between an optical fibre is suspended for measuring the displacement between the respective structural members. As the different member and/or parts of such structural arrangement typically expand or contract in dependence of the temperature that the sensor is exposed to, the fibre does not only measure the movement in dependence of the physical quantity that is measured, but also a movement due to a change of temperature. This causes such a sensor to be accurate only in a narrow temperature bandwidth.

By, for instance, simultaneously measuring the temperature of the sensor this effect can be, at least partly, compensated for during processing of the measurement signals. This however, requires to integrate a temperature sensor and to perform an extensive and complex calibration of each individual sensor over a predetermined temperature range. In addition, as the temperature induced error can be a non-linear with temperature, this requires more complex post processing of the raw measurement signals in order to compensate and if the temperature runs out of the calibration range, the accuracy can no longer be guaranteed.

It is a goal of the present invention, next to other goals, to obtain a fibre-optic sensor for measuring a physical quantity, such as a pressure, force, acceleration or tilt angle, wherein a temperature induced measurement error is minimized, or at least reduced, wherein at least some of the aforementioned problems are at least partly alleviated.

In a first aspect, the invention relates to a fibre-optic sensor for measuring a physical quantity, such as a pressure, force, acceleration or tilt, comprising:

an optical fibre comprising at least a first measurement section for measuring a strain in said optical fibre;

a first structural member and a second structural member, wherein said optical fibre is connected to a first fibre connection section of the first structural member and is connected to a second fibre connection section of the second structural member, wherein said first and second fibre connection sections are arranged on opposite sides of the first measurement section, such that at least said first measurement section is suspended between said first and second fibre connection sections;

wherein at least one of the first and second structural members is movable relative to the other of the first and second structural members in at least a first direction that is substantially parallel to the optical fibre that is suspended between said first and second fibre connection sections for measuring the relative movement between the first and a second structural members, wherein the one of the first and second structural members is arranged to move in dependence of the physical quantity that is measured; and wherein said first structural member is made from a first material having a first coefficient of thermal expansion and said second structural member is made from a second material having a second coefficient of thermal expansion that is different from said first coefficient of thermal expansion.

By selecting materials having different coefficients of thermal expansion in such a manner that a temperature induced strain in said optical fibre due to a temperature change is reduced, preferably minimized, a sensor is obtained that is less susceptible to measurement errors due to a change in temperature. A thermal expansion (or contraction), due to the temperature change, of the first structural member, causes a displacement of the first fibre connection section and (in case the second fibre connection section would not displace) a corresponding extension (or contraction) in the length of the optical fibre that is suspended between said first and second fibre connection sections. This can at least partially be compensated for by a thermal expansion (or contraction), due to the temperature change, of the second structural member, which causes a displacement of the second fibre connection section, such that an extension (or contraction) of the suspended optical fibre, due to the temperature change, is substantially reduced, preferably minimized. As such, it is preferred that the first and second materials are chosen such that (at least) a temperature induced strain in said optical fibre due to a temperature change is reduced, preferably minimized Hence, the choice of respective coefficients of thermal expansion allows that the respective fibre connection sections displace, due the temperature change, over a substantially equal distance such that the distance between said fibre connection sections, or at least ends of the respective fibre connection sections that are closest to each other, remains substantially equal over a predefined temperature range. Fibre connection sections can refer to points, lines, sections, areas, and the like where the fibre is connect to another member. Thereby, any thermally induced strain, due to the fact that the suspended length of the optical fibre between said fibre connection sections remains substantially equal, is reduced, or even minimized. The fibre is preferably fixedly connected, for instance by means of gluing or the like, at the fibre connection section.

For instance, at rest and at a reference temperature, a distance between the first and second fibre connection sections along the fibre defines a suspended length and wherein said first and second material are chosen such that said first and second coefficients of thermal expansion are such that a change of the suspended length due to a change of temperature is less than a change of the suspended length when the first and second structural members would be made from materials having the same thermal coefficient of expansion. The suspended length can be defined as the distance between connection points (of the respective sections) that are nearest to each other. Said first and second materials are preferably chosen such that the suspended length remains unchanged due to a temperature change.

Hence, with a reduced temperature (or thermally) induced strain it is meant that a change of the suspended length (and thereby a strain induced in the optical fibre) due to a change of temperature is less than a change of the suspended length when the first and second structural members would be made from materials having the same thermal coefficient of expansion.

A compensation for changing (environmental) temperatures is hereby automatically achieved in a passive manner, i.e. no temperature dependent calibration and active compensation by means of a post-processing of the raw measurement data is required to deduct the temperature influences from the obtained measurements. A more robust sensor is hereby obtained as well, that is less susceptible to errors made during the installation and/or configuration of the measurement setup, as the step of configuring the active compensation is no longer necessary.

This approach of passive temperature compensation can be used in any type of fibre-optical sensor for measuring a physical quantity that employs such a setup with an optical fibre that is suspended between to structural members wherein at least one of the structural members is arranged movably with respect to the other and wherein the optical fibre is arranged for measuring the respective movement. Examples of such fibre-optical sensors are for instance pressure sensors, tilt angle sensors, accelerometers, force sensors, geophones, hydrophones, displacement sensors and the like.

Different solutions can be employed for measuring the local deformation of the optical fiber at the location of the measurement section. For instance, a Fabry-Perot interferometer can be employed, which is based on the principle of interferometry, and typically has partially reflective glass optical flats that are spaced apart. If the relative distance between the partially reflective glass optical flats changes, due to for instance a local deformation of the optical fiber, the spectrum of the reflected light is also altered. Another option would be to apply a fiber Bragg grating (FBG) at the measurement section, wherein a type of distributed Bragg reflector is constructed in a short section (i.e. the measurement section) of an optical fiber that reflects particular wavelengths of light and transmits all others. If the measurement section is deformed, the properties of the grating also change, thereby leading to a shift in the wavelengths that are reflected. Note that these examples are not limiting. Preferably, the measurement section comprises at least one fibre-Bragg-grating (FBG).

Preferably, the first and second structural members with the respective thermal coefficients of expansion are arranged to reduce, preferably to minimize, a change in a distance between the first and second fibre connection sections along the fibre due to temperature change. As explained above, hereby the strain induced into the optical fibre due to the temperature change is minimized, such that the error on the measurements due to the temperature change is also minimized.

It is preferred that displacements, due to a temperature change, of the first fibre connection section and the second fibre connection section along the first direction is defined by the respective coefficient of thermal expansion, the temperature change and a respective characteristic length of the respective structural member; and wherein the coefficient of thermal expansion of the material of the respective structural member having the greater characteristic length, of the first and second structural members, is less than the coefficient of thermal expansion of the respective structural member having the smaller characteristic length.

By determining the respective characteristic lengths of the first and second structural members, one is able to define the optimal ratio between the first and second coefficient of thermal expansion, wherein the displacement of the first fibre connection section due to a temperature change is equal to the displacement of the second fibre connection section due to the temperature change, such that a distance between said connection sections remains substantially constant. Thereby, the part of the optical fibre that is suspended between the respective first and second fibre connection sections experiences substantially no change of length, such that no thermally-induced strain (i.e. a strain resulting from thermal expansion of the sensor) is experienced by the respective part of the optical fibre, and thus by the measurement section that is arranged in the respective part of the optical fibre. As the coefficient of thermal expansion is often material specific, one can select the respective first and second material that satisfy the optimal ratio, or at least approach the optimal ratio, such that the thermally-induced strain is at least reduced (i.e. minimized) with respect to the situation wherein the first and second structural member would have been made from the same material, or at least materials having the same coefficient of thermal expansion.

It is then preferred that said respective characteristic length is equal to the displacements of the respective fibre connection section due to the temperature change divided by the product of the respective coefficient of thermal expansion and the temperature change. The equation defining the displacements of the respective first and second fibre connection sections due to a change in temperature is as follows:

$$\Delta L_i = L_{char,i} \alpha_i \Delta t \text{ for } i=1,2, \qquad (1)$$

wherein $\Delta L_i$ is the displacement due to the change of temperature of the i-th fibre connection section, $L_{char,i}$ is the characteristic length of the i-th fibre connection section, $\alpha_i$ is the i-th coefficient of thermal expansion and $\Delta t$ is the total change of temperature.

Preferably, the ratio of the greater of the first and second coefficients of thermal expansion over the smaller of the first and second coefficients of thermal expansion is greater than 1 and less than twice the ratio of the greater characteristic length over the smaller characteristic length deducted by 1, preferably substantially equal to the ratio of the greater characteristic length over the smaller characteristic length. In the latter case, one can fully cancel thermally-induced strain that is induced onto the respective part of the optical fibre, as is shown below as the change in the suspended length is equal to 0:

$$\Delta L_1 - \Delta L_2 = 0 = (L_{char,1}\alpha_1 - L_{char,2}\alpha_2)\Delta t \rightarrow \qquad (2)$$

$$(L_{char,1}\alpha_1 - L_{char,2}\alpha_2) = 0 \rightarrow \qquad (3)$$

$$\frac{\alpha_1}{\alpha_2} = \frac{L_{char,2}}{L_{char,1}}. \qquad (4)$$

Now assuming that $L_{char,2} > L_{char,1}$ then substituting the relation into Eq. (4) results in that $\alpha_2 > \alpha_1$. Hence, a ratio $\alpha_1/\alpha_2$ greater than 1 would thereby already reduce (with respect to the reference wherein the first and second structural members would be made from materials having the same (lower) coefficient of thermal expansion) the change in suspended length ($\Delta L_1 - \Delta L_2$). At the same time, however, a too high ratio would cause an overcompensation that ultimately causes a greater (absolute) change in suspended length. Hence, again assuming $L_{char,2} > L_{char,1}$, the selection of the ratio $\alpha_1/\alpha_2$ should be such that:

$$|L_{char,1}\alpha_1 - L_{char,2}\alpha_2| < |L_{char,1}\alpha_2 - L_{char,2}\alpha_2|,$$

which is always true for $1 < \alpha_1/\alpha_2 < 2L_{char,2}/L_{char,1} - 1$.

Preferably, the first material has a first coefficient of thermal expansion that is greater than the second coefficient of thermal expansion of the second material. Hereby, the above described effect can be obtained.

The geometric effect of the temperature change can thus be at least partially compensated for, as is described above. The inventors have found that even with a (perfect) geometric compensation, a small temperature dependent error still remains. In a preferred embodiment, said optical fibre is preferably made from a third material, such as a suitable glass, having a temperature sensitivity of the measurement section of the optical fibre, e.g. comprising of a thermal coefficient of expansion and a temperature coefficient of the refractive index of the fibre, and wherein said first and second coefficient of thermal expansion are such that the temperature sensitivity of the measurement section of the optical fibre is at least partially compensated for.

The optical fibre itself is also affected, due to the by the change in temperature. This temperature sensitivity is mainly the result of the thermal coefficient of expansion of the material of the fibre and a temperature coefficient of the refractive index of the fibre. Hence, even a perfect geometric compensation, as has been described above, cannot fully compensate for a thermally induced measurement error of the sensor. By modifying the first and/or second coefficients of thermal expansion that would lead to a perfect geometric compensation, the effect of the temperature sensitivity of the fibre can also be compensated for. Hence, this compensation can be considered as an over- or under-compensation with respect to the perfect geometric compensation.

Using the fact that the linear expansion coefficient $\alpha_L = (1/\Lambda)(\delta\Lambda/\delta T)$ and the temperature coefficient of the refractive index $\alpha_{TCRI} = (1/\bar{n})(\delta\bar{n}/\delta T)$ and dividing by the Bragg wavelength, $\lambda_B$, the temperature sensitivity of a pure, unsuspended, measurement section (e.g. an Fibre-Bragg grating) of an optical fibre is defined as:

$$\delta\lambda B/\lambda B = (\alpha_{TCRI} + \alpha_L)\delta T, \quad (5)$$

where:
$\alpha_{TCRI}$: Temperature coefficient of the refractive index ($K^{-1}$)
$\alpha_L$: Linear expansion coefficient ($K^{-1}$)
$\delta T$: Change in temperature (K)

For a silica fiber, typical values for $\alpha_{TCRI}$ and $\alpha_L$ are $7 \cdot 10^{-6} K^{-1}$ and $0.5 \cdot 10^{-6} K^{-1}$ respectively at 1550 nm. Using Equation (5), $\delta\lambda_B/\lambda_B = 7.5 \cdot 10^{-6} K^{-1}$. At 1550 nm, this is a change of 12 pm for a 1□ rise.

When a measurement section (e.g. an Fibre-Bragg grating) of an optical fibre is subjected to longitudinal strain at a constant temperature, the Bragg wavelength varies due to the change in the grating period $\Lambda$ and photoelastic induced change in the refractive index. Strain on the fiber causes a displacement of atoms in the glass fiber and thus a change $\delta n$ of the refractive index. The photoelastic effect is given by:

$$\delta n = -1/2\bar{n}^2 p_e \varepsilon, \quad (6)$$

where:
$p_e$: photoelastic coefficient of the medium (−)
$\varepsilon$: induced strain on the grating ($\delta\Lambda/\Lambda$) (−)

The negative sign of Eq. (6) implies that extending the fiber decreases n, provided that $\varepsilon$ is positive. Differentiating with respect to $\Lambda$ and then divide by $\lambda_B$, and use Eq. (6), a FBG strain sensor may be described as following $$\delta\lambda B/\lambda B = (1 - 1/2\bar{n}^2 p_e)\varepsilon \quad (7)$$

$p_e$ of silica glass is approximately 0.22. An induced strain of $10^{-4}$ at a reflected wavelength of 1550 nm, corresponds to a Bragg shift of $\delta\lambda_B = 120$ pm or 1.2 pm/με. Equating Eq. (5) and (7) allows to obtain a direct relation between the temperature change and a thermally induced strain measurement error. By multiplying this strain-error per degree temperature by the respective suspended length allows to obtain the respective equivalent thermal induced change-of-length-error, that can be considered as an equivalent coefficient of thermal expansion, that is to be compensated for by the selection of the respective first and second coefficients of thermal expansion.

As, for a silica glass fibre (having a grating that reflects at the 1550 nm wavelength), the ratio $\delta\bar{n}/\delta T$ is positive, such this equivalent thermal induced change-of-length-error can be compensated for by a slight overcompensation with respect to perfect geometric compensation, such that:

$$\frac{\alpha_1}{\alpha_2} > \frac{L_{char,2}}{L_{char,1}}.$$

For glass fibres having a negative $\delta\bar{n}/\delta T$ (for instance made of fluoride glass), this equivalent thermal induced change-of-length-error can be compensated for by a slight under-compensation with respect to perfect geometric compensation, such that:

$$\frac{\alpha_1}{\alpha_2} < \frac{L_{char,2}}{L_{char,1}}.$$

It is then further preferred that said first and second structural members with the respective thermal coefficients of expansion are arranged to obtain a predefined change in a distance between the first and second fibre connection sections along the fibre due to temperature change and wherein said predefined change is such that the temperature sensitivity of the measurement section is at least partially compensated for, preferably at least 50% compensated, more preferably at least 75% compensated for, most preferably at least 90% compensated for. By over-, or under-compensating with respect to the geometric compensation, it is possible to also reduce the effect of the temperature sensitivity of the optical fibre itself, such that the overall temperature sensitivity of the sensor is further reduced.

It is noted that this compensation can also be applied separate from the feature that the first structural member is made from a first material having a first coefficient of thermal expansion and said second structural member is made from a second material having a second coefficient of thermal expansion that is different from said first coefficient of thermal expansion. Such a sensor could comprise a first and second structural member made from a first material having a first coefficient of thermal expansion (i.e. both structural members are made from the same material), wherein the optical fibre is made from a third material, such as a suitable glass, having a thermal coefficient of expansion and a temperature coefficient of the refractive index that define a temperature sensitivity of the measurement section and wherein the first material is chosen such that it at least partially compensates for the temperature sensitivity of the measurement section. More in particular, a measurement error introduced due to a change of the suspended length due to a change in temperature, is at least partially compensated for by the temperature sensitivity of the measurement section.

In a preferred embodiment of the fibre optic sensor, at least said first measurement section is arranged with a tensile preloading by providing a fibre biasing mechanism that is arranged for urging one of the first and second fibre connection sections away from the other of the first and second fibre connection sections along at least the first direction. This allows for creating a tensile prestress in the optical fibre, such that a relative shortening of the suspended length, i.e. a relative contraction of the optical fibre, can also be determined using the measurement section. This occurs for instance in case the relative movement between the first and a second structural members would bring the first and second fibre connections closure together, thereby reducing the tensile stress (and strain) in the suspended part of the optical fibre.

It is preferred that the optical fibre comprises a second measurement section for measuring a strain in said optical fibre; wherein the fibre is connected to a third fibre connection section of the first structural member, that is different from the first fibre connection section of the first structural member, and wherein the second measurement section is arranged in between the third and second fibre connection sections, such that the fibre spans from the first fibre connection section to the second fibre connection section and subsequently to the third fibre connection section. Hereby, a so-called double span arrangement is obtained, wherein the respective fibre sections are preferably pre-stressed, such that they effective act as the fibre biasing mechanism. It is further preferred that the first, second and third fibre connection sections are all arranged along a line substantially parallel to the first direction.

This specific arrangement of the optical fibre results in more accurate measurements. Upon relative movement between the first and a second structural members the second fibre connection section moves with respect to the first and third fibre connection sections, thereby one of the measurement section and second measurement section will contract, whereas the other of the measurement section and second measurement section elongates. For instance, in combination with Fibre Bragg Grating arranged in the measurement sections, this results in a combined increase of the pitch in the FBG arranged on one side, and a decrease of the pitch of the FBG on the other side. As a result, the wavelengths of the optical signal in the fibre, which are reflected respectively by the respective measurement section and second measurement section, will likewise change. The wavelength of the reflection of the one of the measurement section and second measurement section, as a result of the decrease in tension, will likewise decrease, and the wavelength of the reflection of the other of the measurement section and the additional measurement will increase with a same amount due the change in tension, thereby effectively doubling the signal associated to the relative movement.

In addition, a synergistic effect is obtained. Due to the double span setup, wherein the same optical fibre comprises the measurement section and second measurement section on opposite sides of the second fibre connection section, a strain induced in the optical fibre due to a temperature change (i.e. thermally-induced strain), causing the first and second structural members to contract or expand, will introduce a substantially equal amount of strain in the optical fibre and thereby in the respective measurement sections, such that any remaining thermally-induced strain that is not compensated for by the selection of respective coefficients of thermal expansion, can still be determined (and thereby compensated for) though the double span setup. Hereby, an optical sensor is obtained that is highly accurate over a broad temperature range.

It is preferred that the fibre-optic sensor is substantially symmetric and wherein the line of symmetry intersects the second fibre connection section and is substantially perpendicular to the first direction. Hereby, the fibre-optic sensor has the same characteristics if the first and second structural members move with respect to each other in a first direction and a second direction opposite to the first direction. For example, in case of an inclinometer, this means that the sensor responds identically when exposed to a first (positive) angle compared to a second (negative) angle in the opposite direction, i.e. a symmetric response of the sensor is obtained. In addition, this symmetric response is obtained even in case the respective first and second structural members expand or contract due to a temperature difference, as both sides (with respect to the line of symmetry) expand or contract in a similar way. Due to the differences in the first and second coefficient of thermal expansion, the effect of the thermal compensation (that was described above) is also equal on both sides of the respective line of symmetry.

In a preferred embodiment, the first structural member is a frame member and the second structural member is a movable mass that is movable in at least the first direction. This allows, for instance, obtaining a tilt sensor that can measure the tilting position with reference to gravity or an accelerometer, wherein acceleration along the first direction can be measured. As the movable mass is arranged to respond to the acceleration (e.g. gravity) and will move with respect to the frame member, a strain is imposed onto the optical fibre, i.e. at least the part that is suspended between the respective frame member and movable mass, that can be determined by means of the measurement section arranged in the respective part of the optical fibre. This measured strain can be post-processed to determine the respective tilt angle or acceleration that is imposed onto the movable mass. As such sensors, are often used for structural health monitoring of large (infrastructural) structures, such as bridges, wind turbines, skyscrapers and the like, that are exposed to varying environmental conditions, it is important the reliable measurement results can be obtained in all conditions and seasons. In other words, the sensor should give (in case the structure has not changed whatsoever) the exact same results during an extreme heatwave in the summer as during an extreme cold event in the winter. Hence, the sensors have to operate over a large span of different temperatures. The fibre-optic sensors according to the invention provides for such a sensor by using the different coefficients of thermal expansion that can (passively) compensate for the temperature differences.

Preferably, the movable mass is connected to the frame member by means of a, preferably flexible, hinge such that the movable mass is arranged to pivot back and forth with respect to the frame member under the influence of the physical quantity. The hinge connects the frame member and movable member, such that the movable mass is arranged to pivot (back and forth) with respect to the frame member along a pivoting axis. As, when the frame member and movable mass expand or contract due to a temperature change, their relative change with respect to each other is defined with respect to the hinge interconnecting the two. Hence, the respective first and second characteristic lengths can be determined on the basis of the distance, preferably along at least, or only, the first direction, between the hinge and the respective ends of the first and second fibre connection sections between which the optical fibre is suspended. This allows to more easily determine the respective lengths and select the respective materials for the frame member and the movable mass that will reduced the temperature induced strain in said optical fibre due to a temperature change.

It is then preferred that one of the movable mass and frame member comprises a hinge connecting section and wherein said hinge is formed by a leaf spring element that is coupled to the one of the movable mass and frame member through the hinge connecting section, wherein said hinge connecting section is arranged to abut said leaf spring element on opposite sides of the leaf spring in a substantially equal manner. As the frame member and movable mass are made from (different) materials having different coefficients of thermal expansion, they cannot be integrally manufactured from a single piece of material. The respective hinge connecting section that allows connecting respective movable mass and frame member made from the respective materials, such that the movable mass is allowed to pivot back and forth.

Preferably, the hinge connecting section is a clamping section for clamping said leaf spring element, wherein said clamping section comprises two clamping members that are movable with respect to each other for clamping said leaf spring element in between said clamping members and wherein said clamping members each comprise an abutment section for abutting a respective side of the leaf spring and wherein said abutment sections are equally shaped and arranged mirror symmetric with respect to the leaf spring element. Such a construction enables to clamp the leaf spring element in a substantially symmetric manner, such that the stiffness of the hinge coupling that is experienced by the leaf spring, is substantially equal, i.e. at least 90%, preferably 95% or higher, when pivoting back and when pivoting forth.

It is further preferred that the hinge connecting section comprises an adjustable preloading mechanism for adjusting the clamping force applied to the leaf spring element. Hereby, the response and/or sensitivity of the sensor can be fine tuned.

In a preferred embodiment, the first part of said hinge connecting section is monolithic with the one of the movable mass and frame member, wherein said first part preferably comprises one of the clamping members. The amount of separate parts can be reduced as much as possible, such that the assembly of the sensors is simplified.

In a preferred embodiment of the fibre-optic sensor, the other of the movable mass and frame member comprises a respective hinge connecting section and wherein the leaf spring element is coupled to the other of the movable mass and frame member through the respective hinge connecting section. As both the movable mass and frame member are arranged with their respective hinge connecting section, a separate hinge, such as a flexible hinge like, for instance, a leaf spring, can be used for interconnecting the movable mass and frame member. This thus allows using the respective first and second materials having different coefficients of thermal expansion for the movable mass and frame member, as is described above, while the hinge can be made from yet another material. The material for the hinge can thereby be selected on the basis of the requirements for the hinge. For instance, in case a traditional hinge having at least two parts that are arranged to be movable with respect to each other (with respect to, for instance, a hinge axis) materials can be selected on the basis of their friction and/or stick-slip properties. In case a flexible spring in the form of a leaf spring is used, the material can be selected to have a high yield, which is beneficial for leaf springs. Hence, a (passive) temperature compensated sensor with a high performance can be obtained.

Preferably, said hinge connecting section is arranged such that said leaf spring element experiences a substantially equal stiffness on opposite sides of the hinge connecting section abutting said leaf spring, such that the stiffness of the leaf spring element that is experienced by the movable mass is substantially equal when pivoting back and when pivoting forth. Hereby, the fibre-optic sensor has the same characteristics if the first and second structural members move with respect to each other in a first direction and a second direction opposite to the first direction, as was described above.

Preferably, a first characteristic length is defined by a distance, along the first direction, between the flexible hinge and an end of the first fibre connection section arranged on the frame member that faces the second fibre connection section and wherein said second characteristic length is defined by a distance, along the first direction, between the flexible hinge and an end of the second fibre connection section on the movable mass that faces the first fibre connection section. This allows, as was described above, to more easily determine the respective lengths and select the respective materials for the frame member and the movable mass that will reduced the temperature induced strain in said optical fibre due to a temperature change.

In a preferred embodiment, the fibre-optic sensor comprises a housing member and wherein the other of the first and second structural members is connected to the housing member by means of a thermal-stress-reduced coupling, wherein said thermal stress-reduced coupling is arranged to fixedly interconnect the housing member and the other of the first and second structural members while accommodating a relative thermal expansion between the housing member and the other of the first and second structural members in at least the first direction. This allows decoupling the thermal expansion or contraction of the housing member and the other of the first and second structural members, i.e. at least reduce the effect (i.e. induced stress and/or strain) of the expansion or contraction of the housing member on the other of the first and second structural members and vice versa. Hereby, the housing can be made from a material different from the material of the other of the first and second structural members. Hence, the material of the housing can be optimized for its purpose, while not being dependent on restraints dictated by the material properties of the other of the first and second structural members. If, for example, a relatively cheap sensor is to be made, the housing can for instance be made from a plastic or similar material. In case the sensor has to be protected against impacts, or is to be located at a location that poses a high risk of damage, a durable (stainless) steel housing can for instance be applied.

Preferably, the thermal-stress-reduced coupling comprises a hinge coupling for fixedly interconnecting the other of the first and second structural members to the housing member in three translational directions that are substantially perpendicular to each other, wherein said hinge coupling preferably comprises a pin arranged in a correspondingly sized hole. This allows fixing the other of the first and second structural members to the housing member in the three translational directions at a single point, such that the other of the first and second structural members and the housing member are, at least with respect to each other, free to expand and/or contract.

It is preferred that the thermal-stress-reduced coupling comprises a slidable hinge coupling for interconnecting the other of the first and second structural members to the housing member in one translational direction, wherein said slidable hinge coupling preferably comprises a pin arranged in a correspondingly sized slotted hole to accommodate a relative displacement of the pin and the slotted hole due to the relative thermal expansion. For instance, in combination with the above described hinge coupling, the slidable hinge connection allows to constrain a rotational movement between the other of the first and second structural members and the housing member, while still allowing them to independently contract or expand.

In a preferred embodiment, said fibre-optic sensor comprises an adjustable limiting mechanism for limiting an angle with which the movable mass is allow to pivot, wherein said adjustable limiting mechanism preferably arranged for individually adjusting the forward angle and backward angle of the movable mass. This allows, for a tilt sensor, to adjust the working range within which the sensor is active. Secondly, it allows for fibre-optic sensors in general to limit the maximum movement and thus ensure that the sensor components are not overloaded to such an extend that they could be damaged.

In a second aspect, the invention relates to a method of manufacturing a fibre-optic sensor for measuring a physical quantity according to any of the preceding claims, comprising the steps of:
  designing a structural arrangement comprising a first and a second structural member, wherein at least one of the first and second structural members is arranged to be movable, in dependence of the physical quantity to be measured, relative to the other of the first and second structural members;
  defining a first fibre connection section for connecting an optical fibre on the first structural member and a second fibre connection section for connecting the optical fibre on the second structural member such that an optical fibre can be spanned between said first and second fibre connection sections for measuring the relative movement between the first and a second structural members;
  determining a first material having a first thermal coefficient of expansion for the first structural member and a second material having a second thermal coefficient of thermal expansion for the second material, wherein said first and second coefficient of thermal expansion are different such that a temperature induced strain in said optical fibre due to a temperature change is reduced.

The method thereby allows designing and, preferably manufacturing, a fibre-optic sensor for measuring a physical quantity, such as a pressure, force, acceleration or tilt angle, that has a reduced sensitivity to a change of temperature. Preferably, the temperature induced strain in said optical fibre due to a temperature change is minimized, i.e. (passively) compensated for, as has been described above. The respective steps can, for instance, be executed by a computer configured for executing these steps. The structural arrangement and fibre connection sections are designed on the basis of the technical requirements of the fibre-optic sensor that, for instance, specify the quantity to be measured, the sensitivity of the sensor, a maximum size, and the like. On the basis of, for instance, a given temperature range and a maximum allowable error of the sensor within this range, the computer is able to determine a ratio between the respective first and second coefficients of thermal expansion and, preferably, also a subset of materials that would meet the requirements.

In a preferred embodiment of the method, distance between the first fibre connection section and the second fibre connection section defines a suspended length of the optical fibre and wherein the step of determining the first and second material comprises the step of:
  determining the first and second material such that the respective first and second coefficients of thermal expansion are such that a change of the suspended length due to a change of temperature is less than a change of the suspended length when the first and second structural members would be made from materials having the same thermal coefficient of expansion.

As was explained above, this allows computing a ratio between the respective first and second coefficients of thermal expansion that would reduced sensitivity of the sensor to a change of temperature.

The method preferably further comprises the step of manufacturing the fibre-optic sensor. This step preferably comprises the steps of:
  providing the optical fibre comprising a first measurement section for measuring a strain in said optical fibre;
  providing the designed structural arrangement;
  connecting the optical fibre to the first fibre connection section on the first structural member and to the second fibre connection section on the second structural member, such that the first measurement section is suspended between the first and second fibre connection sections.

It is preferred that the step of determining the first and second materials further comprises the steps of:
  determining a temperature sensitivity of the measurement section of the optical fibre;
  determining an adjusted first and/or second coefficient of thermal expansion such that the temperature sensitivity of the measurement section is at least partially compensated for.

As has already been described above, the optical fibre itself is also affected, due to the by the change in temperature. This temperature sensitivity is mainly the result of the thermal coefficient of expansion of the material of the fibre and a temperature coefficient of the refractive index of the fibre. Hence, even a perfect geometric compensation, as has been described above, cannot fully compensate for a thermally induced measurement error of the sensor. By modifying the first and/or second coefficients of thermal expansion that would lead to a perfect geometric compensation, the effect of the temperature sensitivity of the fibre can also be compensated for. Hence, this compensation can be considered as an over- or under-compensation with respect to the perfect geometric compensation.

Preferably, such a method comprises the step of determining the respective first and second coefficients of thermal expansion that lead to the (at least partial, preferably full) geometric compensation. In a second step the determined first and/or section coefficient of thermal expansion are subsequently adjusted such that the temperature sensitivity of the measurement section is at least partially, preferably fully, compensated for. It is however also possible to take the temperature sensitivity of the measurement section of the optical fibre into account when determining the first and/or section coefficient of thermal expansion, such that the temperature sensitivity of the sensor is directly reduced.

The present invention is further illustrated by the following figures, which show preferred embodiments of the fibre-optic sensor. The figures are not intended to limit the scope of the invention in any way, wherein:

FIG. 1 schematically shows a fibre-optic sensor according to a first embodiment for measuring a physical quantity.

Figure 2:
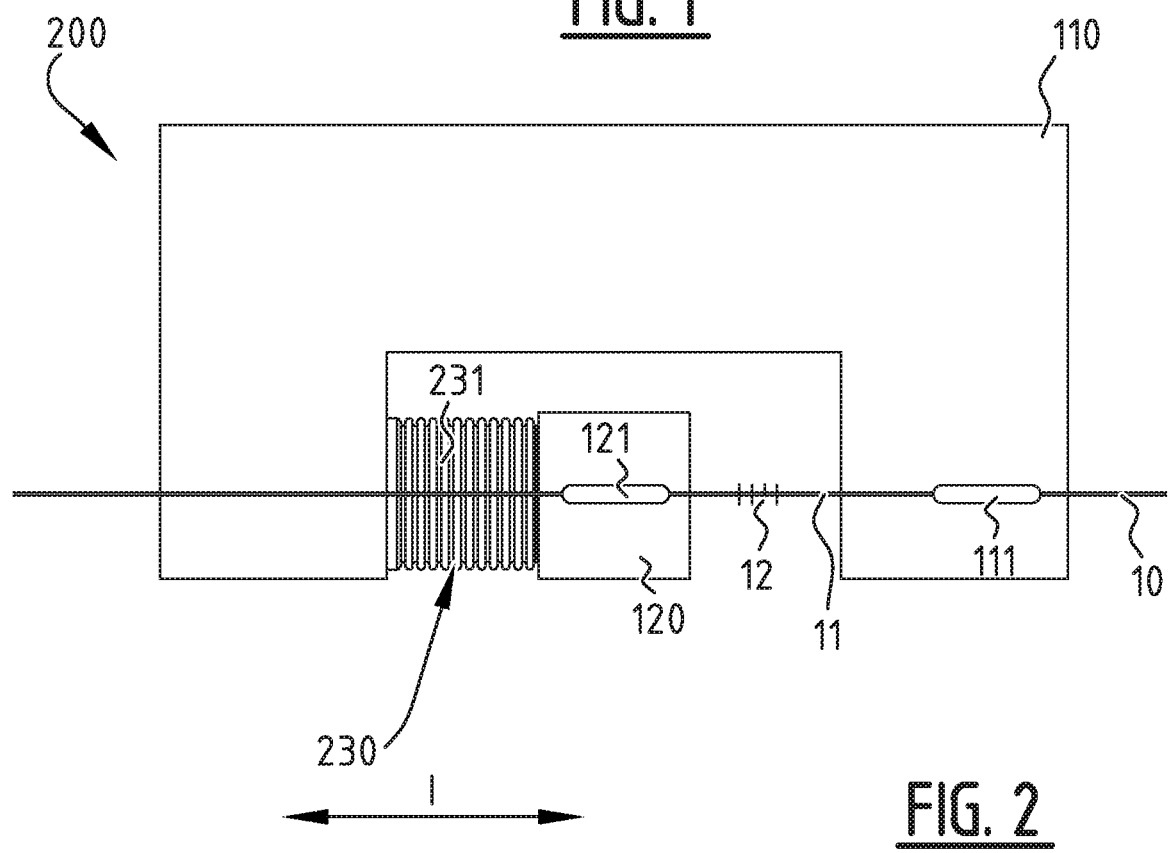

FIG. 2 schematically shows a fibre-optic sensor according to a second embodiment for measuring pressures.

Figure 3:
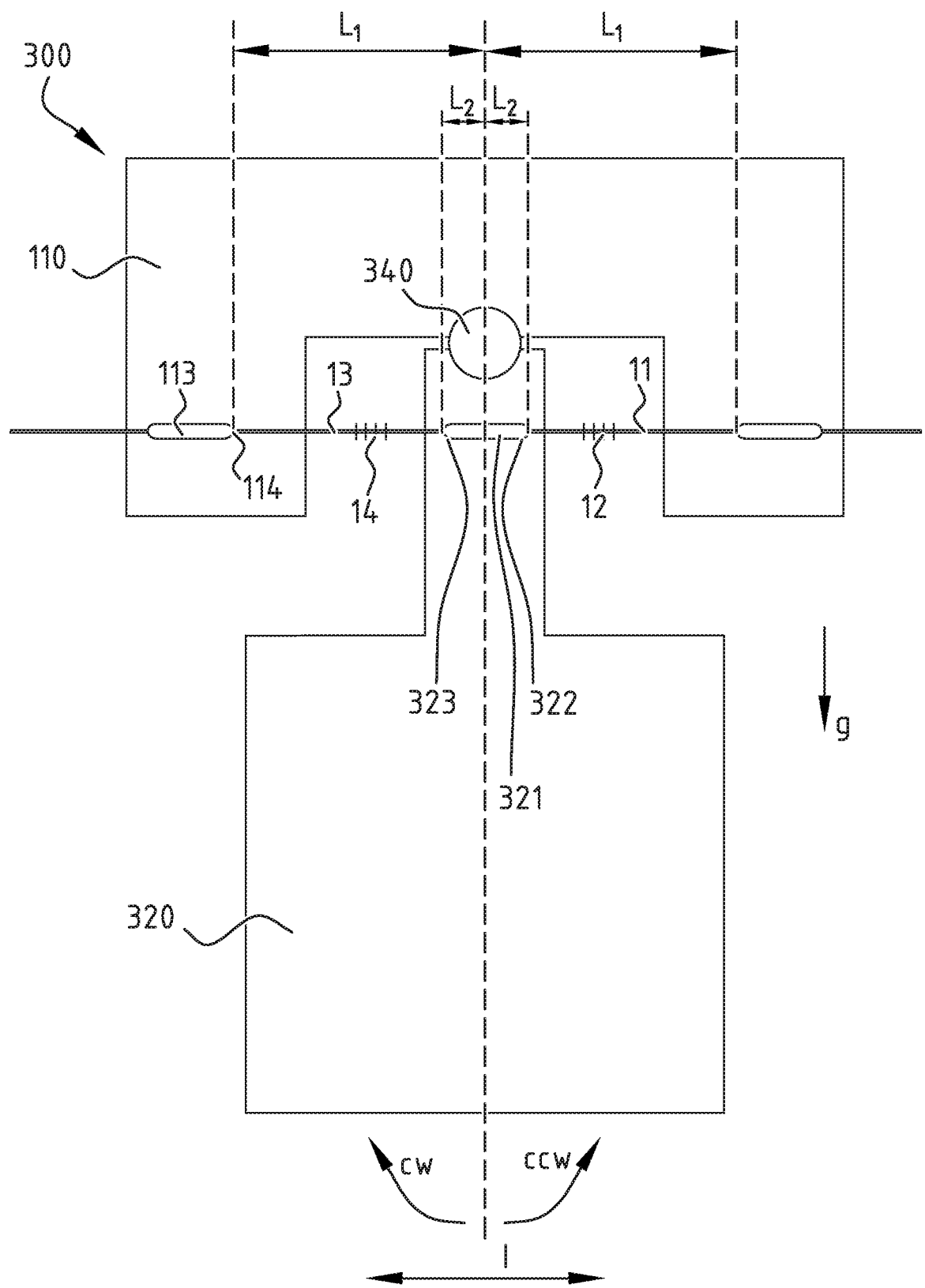

FIG. 3 schematically shows a fibre-optic sensor according to a third embodiment for measuring a tilt angle or accelerations.

Figure 4:
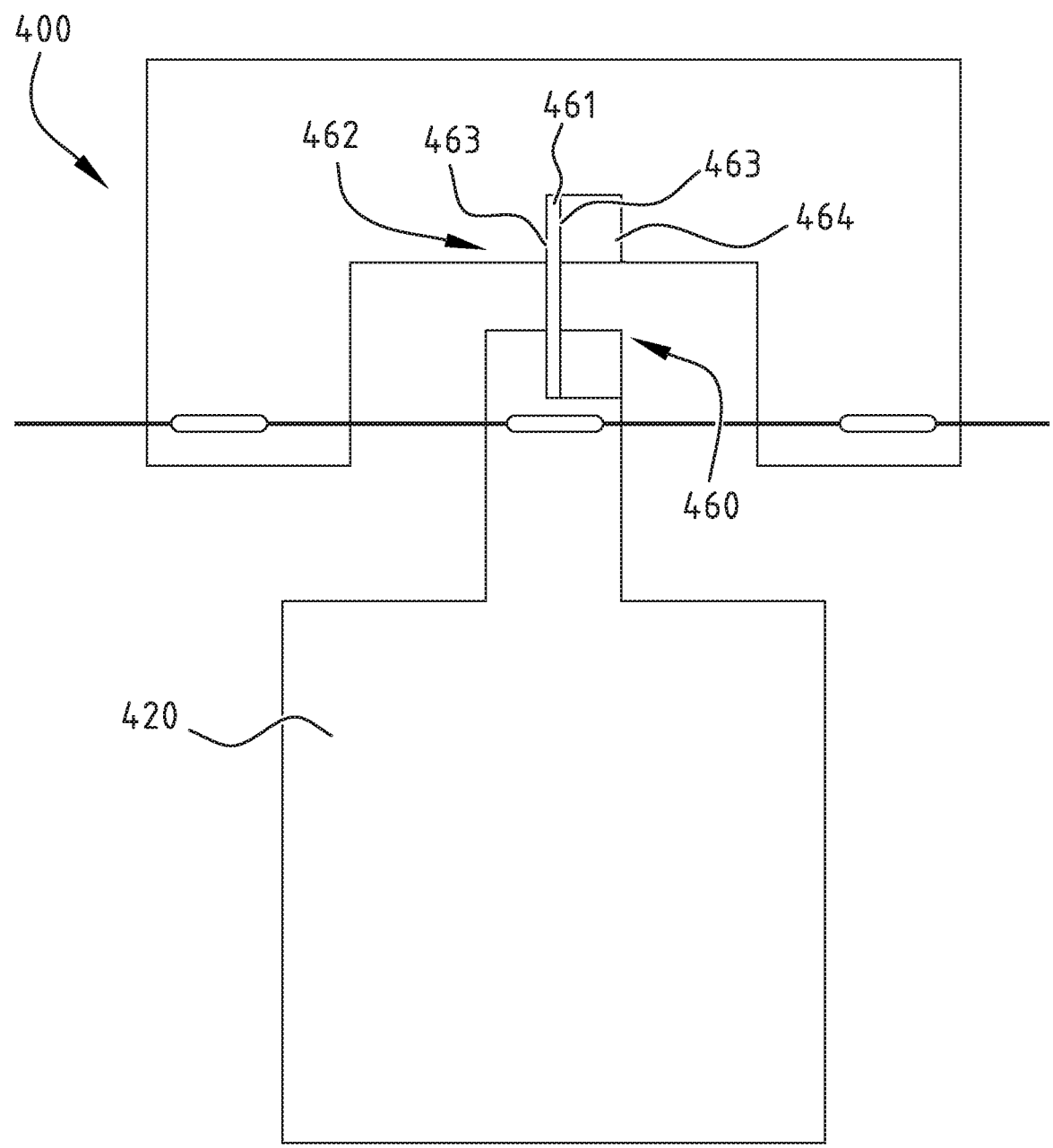

FIG. 4 schematically shows a fibre-optic sensor according to a fourth embodiment for measuring a tilt angle or accelerations.

Figure 5:
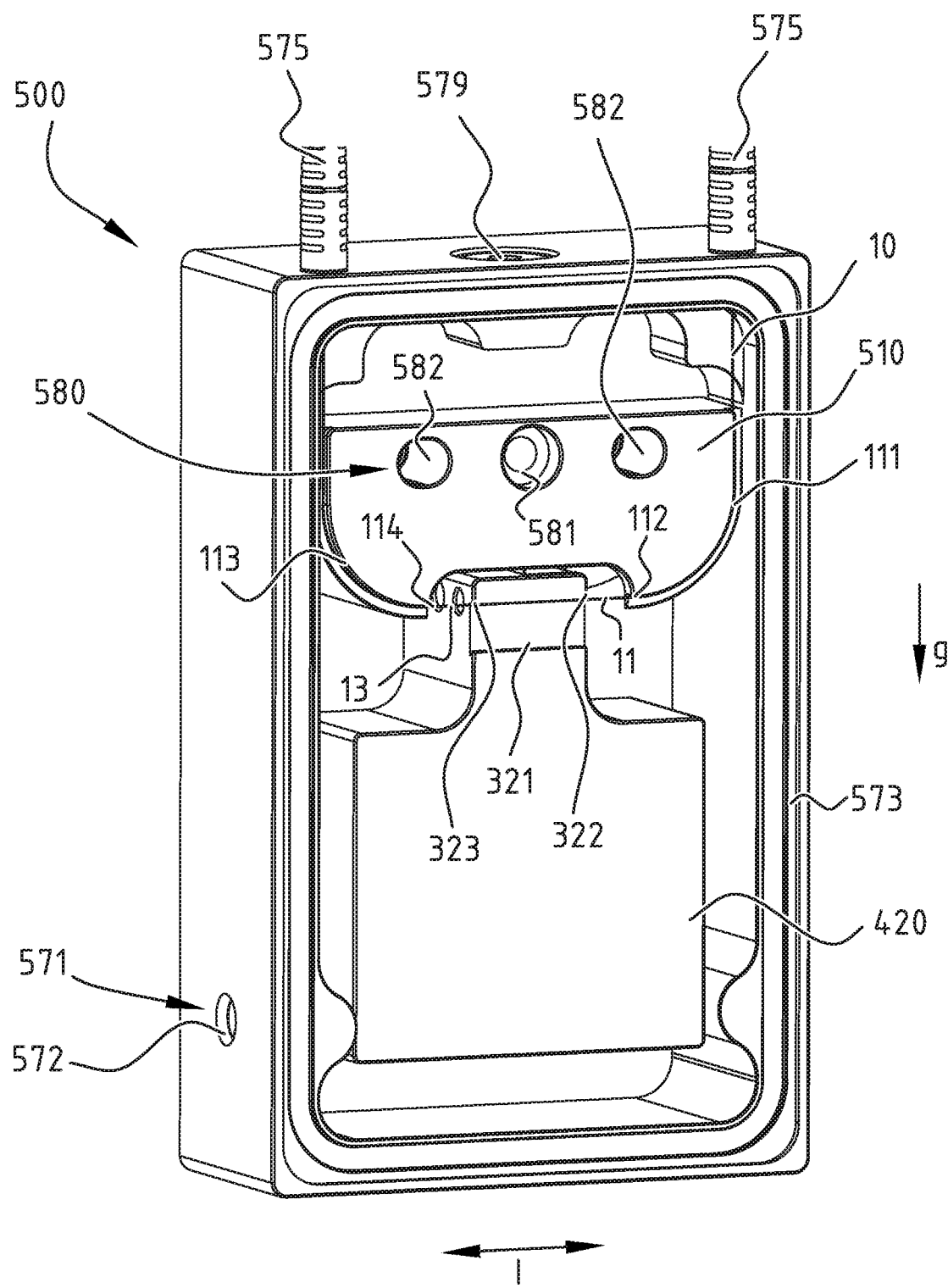

FIG. 5 schematically shows a three-dimensional perspective view of a fibre-optic sensor according to a fifth embodiment for measuring a tilt angle.

Figure 6:
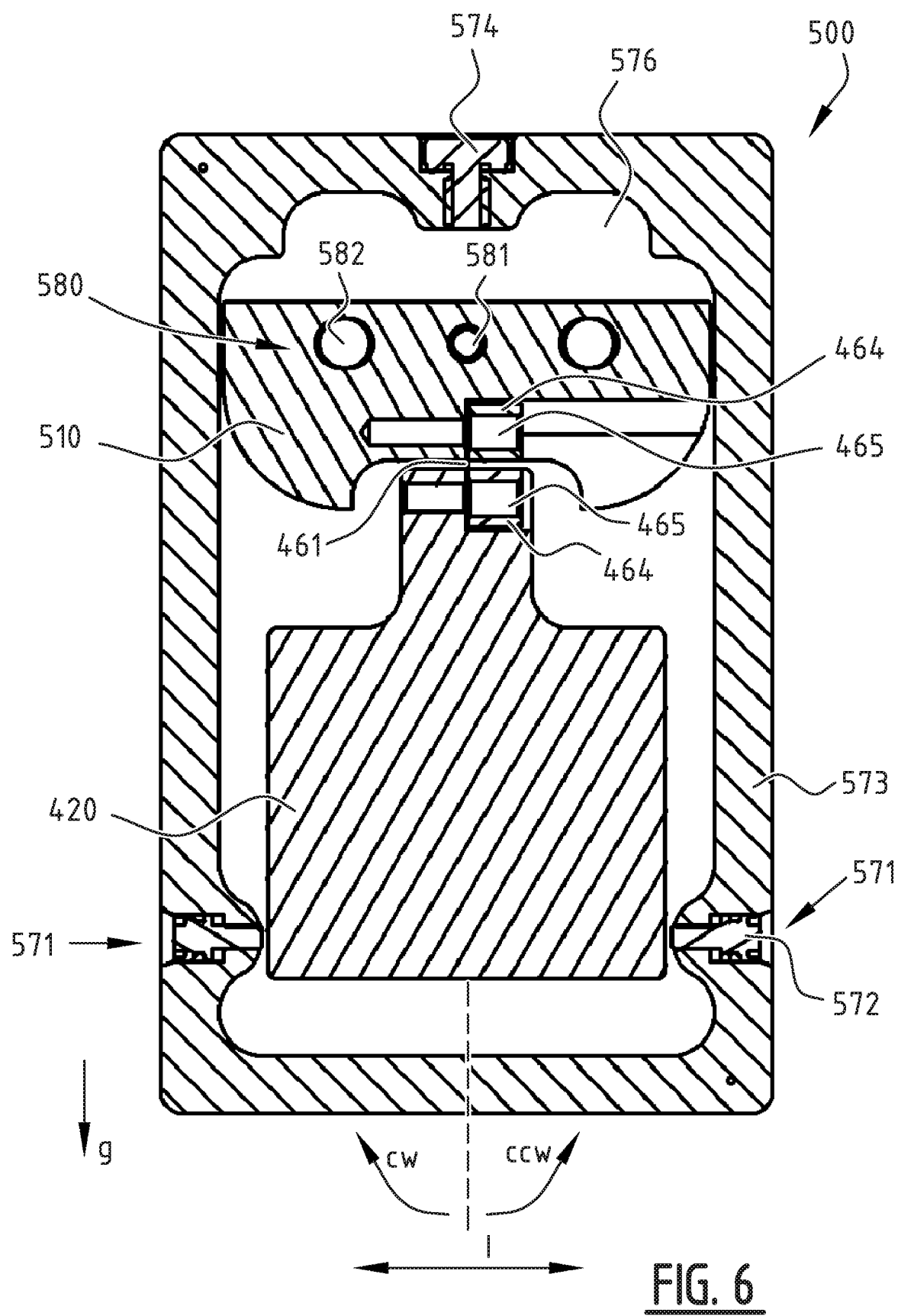

FIG. 6 schematically shows a cross-sectional view of the fibre-optic sensor according to the fifth embodiment for measuring a tilt angle.

FIG. 1 schematically shows a fibre-optic sensor 100 according to a first embodiment for measuring a physical quantity, such as a pressure, force, acceleration or tilt angle. The fibre optic sensor 100 comprises a first structural member, or frame member 110, and a second structural member 120 that is movable with respect to the frame member 110 in at least a first direction I and an optical fibre 10 that is connected to the frame member 110 at a first fibre connection section 111 and to the second structural member 120 at a second fibre connection section 121, such that a suspended part 11 of the optical fibre is suspended between said first and second fibre connection sections 111, 121 having a suspended length Ls. The second structural member 120 is thus movable relative to the frame member 110 in at least a first direction that is substantially parallel to the optical fibre 10.

The sensor 100 further comprises a fibre preloading mechanism 130 for applying a tensile preload to the suspended part 11 of the optical fibre 10, such that a positive (i.e. tensile strain) is applied to the suspended part 11. The fibre preloading mechanism 130 comprises, in the current example, a spring member 131 for applying the tensile preload.

The optical fibre 10 comprises, in the suspended part 11, a measurement section 12, typically in the form of a fibre-Bragg grating (FBG) 12, that is arranged for determining a relative movement between the first and second structural members 110, 120. The tensile preload enables that the relative movement in both directions along the first direction I can be detected using measurement section 12. The measurement section 12 is thus arranged for measuring the relative movement between the first and a second structural members 110, 120, when the second structural member 120 moves in dependence of the physical quantity that is measured. The second structural member 120 can be arranged to movable, along at least the first direction, in response to a force, pressure, acceleration, tilt angle and the like that is applied, or at least transferred, to the second structural member 120.

Upon movement of the second structural member 120, the suspended part 11 experiences a change in length (i.e. deform). The measurement section 12 thereby also deforms, whereby the properties of the grating of the FBG also change, which leads to a shift in the wavelengths that are reflected and/or allowed to pass. This change in wavelength is then converted to a measured physical quantity by means of a suitable interpreter.

In case of temperature change (with respect to a reference temperature), the respective first and second structural members 110, 120 will expand or contract, due to the fact that these members 110, 120 are made from materials having respective first and second coefficients of thermal expansion $\alpha_1$, $\alpha_2$. Hence, if the temperature increase $\Delta T$, the length $L_1$ between a first end 132 of the fibre preloading mechanism 130 that touches, or is connected to, the frame member 110 and the nearest end 112 122 (w.r.t. the preloading mechanism) of the first fibre connection section 111 will increase with a certain length $\Delta L_1 = \alpha_1 L_1 \Delta T$. The distance $L_2$ between a second end 133 of the fibre preloading mechanism 130 that touches, or is connected to, the second structural member 120 and the furthest end 122 (w.r.t. the preloading mechanism) of the second fibre connection section 121, will also change due to the temperature increase $\Delta T$: $\Delta L_2 = \alpha_2 L_2 \Delta T$, wherein $\alpha_2 \neq \alpha_1$. In case $\Delta L_2 \neq \Delta L_1$, the length $L_{pm}$ of the spring 131 and the suspended length $L_s$ of the suspended part 11 will also have to change to accommodate the difference (i.e. $\Delta L_2 - \Delta L_1$) such that an additional strain due to this temperature change is introduced in the suspended part 11 that is measured by the measurement section 12 thereby introducing a measurement error due to the temperature increase $\Delta T$. However, be selecting the correct ratio of $\alpha_1/\alpha_2$ the measurement error due to a temperature change can be reduced, or even fully compensated for, as has been shown above. Lengths $L_1$ and $L_2$ thus determine the respective optimal ratio and are as such considered as the characteristic lengths.

The physical effect of selecting the correct ratio of $\alpha_1/\alpha_2$ is thus, in the current example, that the second structural member has a larger coefficients of thermal expansion ($\alpha_1 < \alpha_2$), such that the expansion $\Delta L_1$ is at least partially compensated by the expansion $\Delta L_2$ that is larger than in case both structural members would have been made from material having the same coefficient of thermal expansion, such that $\Delta L_2 (\alpha_2) > \Delta L_2 (\alpha_1)$.

FIG. 2 schematically shows a fibre-optic sensor 200 according to a second embodiment for measuring pressures. In essence, the fibre-optic sensor 200 corresponds to the fibre-optic sensor 100, with the difference that the fibre preloading mechanism 130 is replaced by a pressure dependent mechanism 230 comprising a bellow 230, or a similar fluid-tight flexible member, preferably having a preferably hollow space, that is arranged to contract or expand in dependence of a pressure that is applied to the fluid-tight flexible member. The bellow 230 is thus arranged to deform in dependence of a pressure difference between a fluid held in the hollow space of the bellow 231 and a fluid surrounding the bellow 230. Bellow 230 can be provided with an sealed interior volume having a reference volume at a reference pressure, such that in dependence of the pressure of a fluid exterior of the bellow 230, it will expand or contract along the first direction I, such that the second structural member 120 moves in dependence of the expansion or contraction of the bellow 230, causing a strain in the suspended part 11 that is measured by the measurement section 12. The pressure of the external fluid can thereby be determined.

Such a sensor 200 can also work vice versa, or the bellow 230 can be connected to an actively controlled reference pressure source (not shown) that is in fluid connection with the bellow 230. The optical-fibre pressure sensor 200 is thus arranged for measuring a relative pressure difference between a known reference pressure and a pressure that is to be determined. It is furthermore noted that the bellow can also be combined with the fibre preloading mechanism 130 of the first embodiment 100.

FIG. 3 schematically shows a fibre-optic sensor 300 according to a third embodiment for measuring a tilt angle or accelerations. The sensor 300 comprises, like the first and second embodiments, optical fibre 10, frame member 110 and a second structural member, which is a movable, in particular a pivotable, mass 320. The frame member 110 and the movable mass 320 are connected by means of a hinge 340 that is arranged for facilitating the pivoting movements of the movable mass 320, with respect to frame member 110, in the clockwise CW and counter-clockwise CCW directions. The optical fibre 10 spans substantially parallel to the first direction I to the first fibre connection section 111 to the second fibre connection section 321 and subsequently to a third fibre connection section 113, wherein a first suspended part 11 of the optical fibre 10, comprising first measurement section 12, is arranged in between the first and second fibre connection sections 111, 321 and a second suspended part 13, comprising second measurement section 14, is arranged in between the second and third fibre connection sections 321, 113. The sensor 300 is seen to be substantially mirror symmetrically arranged with respect to the centrally located mirror symmetry line (or plane) S. The sensor 300 can, for instance, be arranged for measuring acceleration along the first direction I or a tilt angle with respect to gravity g. The first characteristic lengths $L_1$ is thus the distance between the pivot axis of the hinge 340, that corresponds, in at least this view plane, with the mirror symmetry line S and the respective nearest ends 112, 114 of the first and third fibre connection sections 112, 114. The second characteristic length $L_2$ is seen to be the distance between the pivot axis of the hinge 340 and the respective ends 322, 323 of the second fibre connection points. Again, the thermal-induced measurement error due to the expansion or contraction of the respective structural members 110, 320 is reduced if the respective coefficients of thermal expansion are well chosen, as is explained above.

Due to the substantially symmetric arrangement of the optical fibre with respect to the movable mass 320, any remaining thermal-induced measurement error that is not completely compensated for by the selection of coefficients of thermal expansion can be compensated for by the double fibre span 13, 14 that is arranged. As a change in the suspended length $L_s$ (which is the distance between the nearest ends 114, 323 of the respective third and second fibre connection sections 113, 321 and, due to the symmetry, also between nearest ends 112, 321 of the respective first and second fibre connection points 111, 321) would be equal in both the first and second suspended parts 11, 13, this static contribution can be filtered from the measurement results and be compensated for in a post-processing step of the measurement data.

FIG. 4 schematically shows a fibre-optic sensor 400 according to a fourth embodiment for measuring a tilt angle or accelerations. The fibre-optic sensor 400 is similar to the fibre-optic sensor 300, with the difference that a difference hinge mechanism 460, in particular a flexible hinge (i.e. compliant hinge) is arranged. The hinge mechanism 460 comprises a leaf spring element 461 that is held in a respective hinge connecting section 462 that is arranged as clamping section 462 having abutment section 463 on both sides of the leaf spring element 461, for abutting and clamping the leaf spring element 461, that are equally shaped and arranged mirror symmetric with respect to the leaf spring element 461. One of the respective abutment sections 463 is arranged on a clamping member 464 that is movable, or removable, such that the leaf spring element 461 is removable and/or replaceable in the fibre-optic sensor 400. The clamping section 462 is preferably provided with an adjustable preloading mechanism for adjusting the clamping force with which the leaf spring element 461 is clamped in the respective hinge connecting section (i.e. hinge clamping section) 462.

In the embodiment of FIG. 4, the movable mass 420 is also provided with a hinge connecting section 462 as is described above. It is however noted that the leaf spring element 461 can also be formed monolithically with, or fixed otherwise (for instance be means of welding, gluing, or the like) to, the first structural member (i.e. frame member) 410 or the second structural member (i.e. movable mass) 420. In that case the other of the first and second structural members 410, 420 may be fitted with a hinge connecting section 462 such as the hinge connecting section 462 as described above.

FIG. 5 schematically shows a three-dimensional perspective view of a fibre-optic sensor 500 according to a fifth embodiment for measuring a tilt angle, while FIG. 6 schematically shows a cross-sectional view of the fibre-optic sensor 500. The fibre-optic tilt sensor 500 is arranged similar to the fibre-optic sensor 400 according to the fourth embodiment, wherein the arrangement of fibre-optic sensor 400 is arranged within a housing 570. The optical fibre 10 may run between respective fibre connectors 575 that allow for connecting the sensor 500 to external optical wiring. These connectors 575 are preferably arranged onto, and/or to extend through, the housing 570.

Sensor 500 further comprises an adjustable limiting mechanism 571 for limiting an angle with which the movable mass 420 is allow to pivot. The adjustable limiting mechanism 571 may be arranged with bolts 572 that are positioned in a wall 573 of the housing and have threading that allows for moving them (i.e. by screwing the bolts 573 in and out) from, and towards, the movable mass 420 for individually adjusting the forward angle and backward angle (i.e. respectively in the clockwise CW or counter-clockwise CCW with respect to the gravity g) of the movable mass 420.

The housing 570 may be arranged with a (removable) plug 574 for forming a fluid-tight inner volume 576 that can be filled with oil, or any other suitable liquid, for dampening the response of the tilt sensor, which thereby generates more smooth tilt angle measurements that are less susceptible to high frequency disturbances due to vibrations and/or shocks.

The clamping section 462 is seen to be provided with an adjustable preloading mechanism 465, in the form of an bolt member 465, whereby the clamping force with which the leaf spring element 461 is clamped in the respective hinge connecting section (i.e. hinge clamping section) 462 is adjusted by varying the torque with which the bolt member 465 is tightened.

Fibre-optic sensor 500 may further be arranged with a thermal-stress-reduced coupling 580 for interconnecting the housing 570 and the frame member 510. The thermal stress-reduced coupling 580 allows to couple the housing 570 and the frame member 510 in such a way that the housing 570 and frame member 510 are, at least with respect to each other, free to expand and/or contract in at least the first direction I that is substantially perpendicular to the gravity g. The a thermal-stress-reduced coupling 580 may comprises a hinge coupling 581, that can comprise a pin arranged in a correspondingly sized hole, for fixedly interconnecting the frame member 510 to the housing 570 in three translational directions that are substantially perpendicular to each other. The thermal-stress-reduced coupling

580 may furthermore comprise at least one slidable hinge coupling 582, preferably comprises a pin arranged in a correspondingly sized slotted hole to accommodate a relative displacement of the pin and the slotted hole due to the relative thermal expansion. The thermal-stress-reduced coupling 580 thereby interconnects the frame member 510 and 570, while allowing them to expand or contract differently, such that the housing 570 frame member 510 do not exert forces onto each other due to the difference in expansion or contraction that could potential generate a temperature induced error in the measurement results. The frame member 510 and housing 570 can thus easily be made from different materials.

It is noted that the present invention is not limited to the embodiment shown, but extends also to other embodiments falling within the scope of the appended claims.

The invention claimed is:

1. A fibre-optic sensor for measuring a physical quantity, such as a pressure, force, acceleration or tilt, comprising:
   an optical fibre comprising at least a first measurement section for measuring a strain in said optical fibre;
   a first structural member and a second structural member, wherein said optical fibre is connected to a first fibre connection section of the first structural member and is connected to a second fibre connection section of the second structural member, wherein said first and second fibre connection sections are arranged on opposite sides of the first measurement section, such that at least said first measurement section is suspended between said first and second fibre connection sections;
   wherein at least one of the first and second structural members is movable relative to the other of the first and second structural members in at least a first direction that is substantially parallel to the optical fibre that is suspended between said first and second fibre connection sections for measuring the relative movement between the first and a second structural members, wherein the one of the first and second structural members is arranged to move in dependence of the physical quantity that is measured;
   wherein said first structural member is made from a first material having a first coefficient of thermal expansion and said second structural member is made from a second material having a second coefficient of thermal expansion that is different from said first coefficient of thermal expansion, such that a temperature induced strain in said optical fibre due to a temperature change is reduced; and
   wherein the first structural member is a frame member and the second structural member is a movable mass that is movable in at least the first direction.

2. The fibre-optic sensor according to claim 1, wherein said first and second structural members with the respective thermal coefficients of expansion are arranged to reduce a change in a distance between the first and second fibre connection sections along the fibre due to temperature change.

3. The fibre-optic sensor according to claim 1, wherein displacements, due to a temperature change, of the first fibre connection section and the second fibre connection section along the first direction is defined by the respective coefficient of thermal expansion, the temperature change and a respective characteristic length of the respective structural member; and
   wherein the coefficient of thermal expansion of the material of the respective structural member having the greater characteristic length, of the first and second structural members, is less than the coefficient of thermal expansion of the respective structural member having the smaller characteristic length.

4. The fibre-optic sensor according to claim 3, wherein said respective characteristic length is equal to the displacements of the respective fibre connection section due to the temperature change divided by the product of the respective coefficient of thermal expansion and the temperature change; and/or wherein the ratio of the greater of the first and second coefficients of thermal expansion over the smaller of the first and second coefficients of thermal expansion is greater than 1 and less than 1 summed with a ratio of the greater characteristic length over the smaller characteristic length.

5. The fibre-optic sensor according to claim 3,
   wherein the optical fibre comprises a second measurement section for measuring a strain in said optical fibre;
      wherein the fibre is connected to a third fibre connection section of the first structural member, that is different from the first fibre connection section of the first structural member, and wherein the second measurement section is arranged in between the third and second fibre connection sections, such that the fibre spans from the first fibre connection section to the second fibre connection section and subsequently to the third fibre connection section; and
      wherein a first characteristic length is equal to a distance, as seen along the first direction, between said first and third fibre connection sections and wherein a second characteristic length is equal to a width, as seen along the first direction, of the second fibre connection section.

6. The fibre-optic sensor according to claim 3,
   wherein said movable mass is connected to the frame member by means of a hinge such that the movable mass is arranged to pivot back and forth with respect to the frame member under the influence of the physical quantity; and
   wherein a first characteristic length is defined by a distance, along the first direction, between the flexible hinge and an end of the first fibre connection section arranged on the frame member that faces the second fibre connection section and wherein said second characteristic length is defined by a distance, along the first direction, between the flexible hinge and an end of the second fibre connection section on the movable mass that faces the first fibre connection section.

7. The fibre-optic sensor according to claim 1, wherein first material has a first coefficient of thermal expansion that is greater than the second coefficient of thermal expansion of the second material; and/or
   wherein said first and second coefficient of thermal expansion are such that a temperature sensitivity of the measurement section of the optical fibre is at least partially compensated for; and/or
   wherein said first and second structural members with the respective thermal coefficients of expansion are arranged to obtain a predefined change in a distance between the first and second fibre connection sections along the fibre due to temperature change and wherein said predefined change is such that the temperature sensitivity of the measurement section is at least partially compensated for.

8. The fibre-optic sensor according to claim 1, wherein the optical fibre comprises a second measurement section for measuring a strain in said optical fibre;

wherein the fibre is connected to a third fibre connection section of the first structural member, that is different from the first fibre connection section of the first structural member, and wherein the second measurement section is arranged in between the third and second fibre connection sections, such that the fibre spans from the first fibre connection section to the second fibre connection section and subsequently to the third fibre connection section; and/or wherein the first, second and third fibre connection sections are all arranged along a line substantially parallel to the first direction.

9. The fibre-optic sensor according to claim 1, wherein said fibre-optic sensor is substantially symmetric and wherein the line of symmetry intersects the second fibre connection section and is substantially perpendicular to the first direction.

10. The fibre-optic sensor according to claim 1,
wherein said movable mass is connected to the frame member by means of a hinge such that the movable mass is arranged to pivot back and forth with respect to the frame member under the influence of the physical quantity; and/or wherein one of the movable mass and frame member comprises a hinge connection section and wherein said hinge is formed by a leaf spring element that is coupled to the one of the movable mass and frame member through the hinge connection section, wherein said hinge connection section is arranged to abut said leaf spring element on opposite sides of the leaf spring in a substantially equal manner.

11. The fibre-optic sensor according to claim 10, wherein said hinge connection section is a clamping section for clamping said leaf spring element, wherein said clamping section comprises two clamping members that are movable with respect to each other for clamping said leaf spring element in between said clamping members and wherein said clamping members each comprise an abutment section for abutting a respective side of the leaf spring and wherein said abutment sections are equally shaped and arranged mirror symmetric with respect to the leaf spring element.

12. The fibre-optic sensor according to claim 10, wherein said hinge connecting section comprises an adjustable preloading mechanism for adjusting the clamping force applied to the leaf spring element; and/or wherein a first part of said hinge connection section is monolithic with the one of the movable mass and frame member.

13. The fibre-optic sensor according to claim 10, wherein the other of the movable mass and frame member comprises a respective hinge connection section and wherein the leaf spring element is coupled to the other of the movable mass and frame member through the respective hinge connection section; and/or wherein said hinge connection section is arranged such that said leaf spring element experiences a substantially equal stiffness on opposite sides of the hinge connection section abutting said leaf spring, such that the stiffness of the leaf spring element that is experienced by the movable mass is substantially equal when pivoting back and when pivoting forth.

14. The fibre-optic sensor according to claim 1, further comprising a housing member and wherein the other of the first and second structural members is connected to the housing member by means of a thermal-stress-reduced coupling, wherein said thermal stress-reduced coupling is arranged to fixedly interconnect the housing member and the other of the first and second structural members while accommodating a relative thermal expansion between the housing member and the other of the first and second structural members in at least the first direction; and/or wherein said measurement section comprises at least one fibre-Bragg-grating (FBG).

15. The fibre-optic sensor according to claim 1, wherein said fibre-optic sensor comprises an adjustable limiting mechanism for limiting an angle with which the movable mass is allow to pivot.

16. A method of manufacturing a fibre-optic sensor for measuring a physical quantity according to claim 1, comprising the steps of:
designing a structural arrangement comprising a first and a second structural member, wherein at least one of the first and second structural members is arranged to be movable, in dependence of the physical quantity to be measured, relative to the other of the first and second structural members;

defining a first fibre connection section for connecting an optical fibre on the first structural member and a second fibre connection section for connecting the optical fibre on the second structural member such that an optical fibre can be spanned between said first and second fibre connection sections for measuring the relative movement between the first and a second structural members;

determining a first material having a first thermal coefficient of expansion for the first structural member and a second material having a second thermal coefficient of thermal expansion for the second structural member, wherein said first and second coefficient of thermal expansion are different such that a temperature induced strain in said optical fibre due to a temperature change is reduced.

17. The method according to claim 16, wherein a distance between the first fibre connection section and the second fibre connection section defines a suspended length of the optical fibre and wherein the step of determining the first and second material comprises the step of:
determining the first and second material such that the respective first and second coefficients of thermal expansion are such that a change of the suspended length due to a change of temperature is less than a change of the suspended length when the first and second structural members would be made from materials having the same thermal coefficient of expansion.

18. The method according to claim 16, further comprising the steps of:
providing the optical fibre comprising a first measurement section for measuring a strain in said optical fibre;
providing the designed structural arrangement;
connecting the optical fibre to the first fibre connection section on the first structural member and to the second fibre connection section on the second structural member, such that the first measurement section is suspended between the first and second fibre connection sections.

19. The method according to claim 16, wherein the step of determining the first and second materials further comprises the steps of:
determining a temperature sensitivity of the measurement section of the optical fibre; and
determining an adjusted first and/or second coefficient of thermal expansion such that the temperature sensitivity of the measurement section is at least partially compensated for.

20. A fibre-optic sensor for measuring a physical quantity, such as a pressure, force, acceleration or tilt, comprising:
- a housing member;
- an optical fibre comprising at least a first measurement section for measuring a strain in said optical fibre;
- a first structural member and a second structural member, wherein said optical fibre is connected to a first fibre connection section of the first structural member and is connected to a second fibre connection section of the second structural member, wherein said first and second fibre connection sections are arranged on opposite sides of the first measurement section, such that at least said first measurement section is suspended between said first and second fibre connection sections;
- wherein at least one of the first and second structural members is movable relative to the other of the first and second structural members in at least a first direction that is substantially parallel to the optical fibre that is suspended between said first and second fibre connection sections for measuring the relative movement between the first and a second structural members, wherein the one of the first and second structural members is arranged to move in dependence of the physical quantity that is measured;
- wherein said first structural member is made from a first material having a first coefficient of thermal expansion and said second structural member is made from a second material having a second coefficient of thermal expansion that is different from said first coefficient of thermal expansion, such that a temperature induced strain in said optical fibre due to a temperature change is reduced;
- wherein the other of the first and second structural members is connected to the housing member by means of a thermal-stress-reduced coupling, wherein said thermal stress-reduced coupling is arranged to fixedly interconnect the housing member and the other of the first and second structural members while accommodating a relative thermal expansion between the housing member and the other of the first and second structural members in at least the first direction; and
- wherein:
- the thermal-stress-reduced coupling comprises a hinge coupling for fixedly interconnecting the other of the first and second structural members to the housing member in three translational directions that are substantially perpendicular to each other; and/or
- the thermal-stress-reduced coupling comprises a slidable hinge coupling for interconnecting the other of the first and second structural members to the housing member in one translational direction.

* * * * *